D. S. SEBASTIAN.
PIPE WRENCH.
APPLICATION FILED NOV. 12, 1912.
1,059,224.
Patented Apr. 15, 1913.
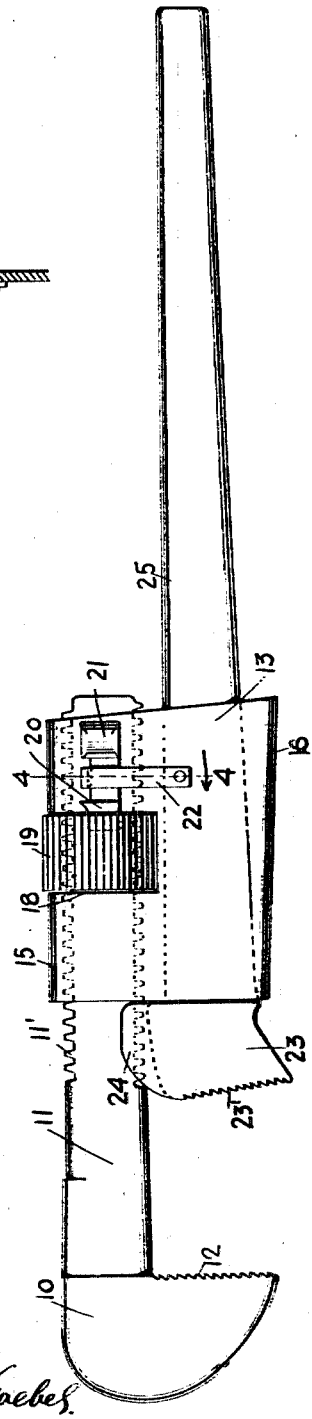
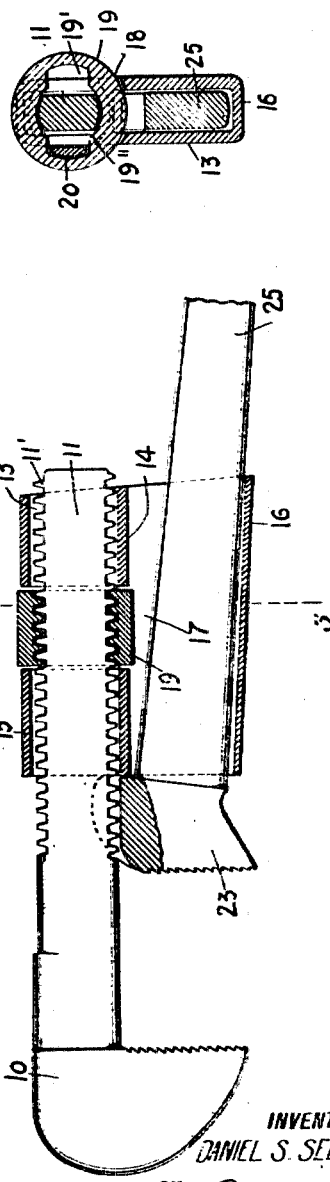
WITNESSES
INVENTOR
DANIEL S. SEBASTIAN,
BY
ATTORNEYS

UNITED STATES PATENT OFFICE.

DANIEL S. SEBASTIAN, OF WALLACE, IDAHO.

PIPE-WRENCH.

1,059,224.  Specification of Letters Patent.  Patented Apr. 15, 1913.

Application filed November 12, 1912. Serial No. 730,852.

*To all whom it may concern:*

Be it known that I, DANIEL S. SEBASTIAN, a citizen of the United States, and a resident of Wallace, in the county of Shoshone and State of Idaho, have invented a new and Improved Pipe-Wrench, of which the following is a full, clear, and exact description.

This invention relates to wrenches and particularly that type of wrenches used by plumbers or others for handling pipes or rods.

The primary object of the invention is to improve the type of wrenches above indicated with respect to quickness of adjustment, reliability of securing such adjustment, and the increase of the gripping effect of the jaws.

The foregoing and other objects of the invention will hereinafter be more fully described and claimed and illustrated in the drawings accompanying this specification in which like characters of reference indicate corresponding parts in all the views, and in which—

Figure 1 is a side view of a preferred form of the invention, the parts being shown as held in one position; Fig. 2 is a partial side view of the same wrench in the same position of adjustment, certain parts being in section and the inner jaw being shown in the position in or toward which it will be operated when in use; Fig. 3 is a transverse sectional detail substantially on the line 3—3 of Fig. 2; and Fig. 4 is a similar detail substantially on the line 4—4 of Fig. 1.

Referring more particularly to the accompanying drawings, a preferred form of this wrench includes an outer jaw 10 to which is connected rigidly a shank 11 having a common form of flattened or segmental screw. Said jaw also has a series of teeth 12, as usual.

At 13 is shown a shell or casing which surrounds the shank 11 and is provided with a longitudinally disposed partition 14 substantially parallel to the rear edge 15 of the casing. Said partition, in connection with the front 16, constitutes a compartment 17 which is preferably flaring toward the inner end; that is to say, the partition 14 and wall 16 diverge inwardly. Said casing at its rear intermediate portion is slotted transversely at 18 for the accommodation of a nut 19 threaded to coöperate with the threaded shank 11. Said nut is preferably milled on its outer surface for convenience of manipulation and is provided interiorly with a slot 19', the ends of which slot are smooth and coöperate with the teeth or threads 11' of the shank when turned in a certain position, whereby the shank may slip freely through the casing and the nut for the purpose of quick adjustment of the wrench. When the adjustment is determined approximately, the nut will be turned through 90 degrees, turning the threaded portions 19'' of the nut into coöperation with the threads 11', whereby the shank will be maintained in proper adjusted position with respect to the casing 13. Any suitable means may be provided auxiliary to the casing to secure the nut from rotation when serving to maintain the proper position just described. For this purpose I show a keeper 20 slidable along the outside of the casing and into one end of the slot 19' of the nut. When in this position the keeper will prevent rotation of the nut and hence the loss of proper adjustment of the wrench. The keeper may be moved into or out of said slot by means of a finger piece 21 and held in either locking or unlocking position by any suitable means such, for instance, as a spring 22 which normally coöperates with the keeper 20 frictionally, but which will not only permit the desired movements of the keeper, but also will permit, upon springing the upper end of the spring away from the casing, the keeper to be removed or replaced, if necessary.

The inner jaw 23 is of peculiar construction and is provided on one or both sides with cams 24 which embrace the sides of the shank 11 and are adapted to bear against the outer end of the casing at points transversely between the threaded portions of the shank. To said jaw 23 is also rigidly connected a lever or handle 25 which is preferably tapered and which extends inwardly through the compartment 17, the wider portion of the lever lying within and substantially filling the narrower outer end of said compartment. It will be noted, therefore, by reference to Fig. 2 especially, that when the jaw 23 is free, the lever connected thereto is free to vibrate to a considerable extent within the space between the walls 14 and 16 of the casing, and in so doing the jaw 23 will roll or bear with its cams upon the outer end of the casing. The first effect, therefore, of the power applied to the lever in the usual manner will be to tend to swing the jaw 23 around the points of the cams 24, the lever approaching, in this movement, the wall 16. The result of this construction and movement is for the teeth 23' to grip most effectively upon the pipe being operated upon.

The several parts of this wrench may be made of any suitable materials and the relative sizes and proportions thereof may be varied to a considerable extent without departing from the spirit of the invention claimed.

Having thus described my invention, what I claim as new and desire to secure by Letters Patent is:

In a pipe wrench, the combination of a pair of jaws adjustable relatively toward each other, one of said jaws having an integral shank and the other of said jaws having a handle, said shank and handle extending inwardly substantially parallel to each other, a casing embracing said shank and handle, a nut coöperating with the casing and said shank for adjusting the wrench and maintaining such adjustment, and a keeper slidable longitudinally along the outside of the casing and coöperating with the nut to prevent unauthorized rotation thereof, said keeper including a finger piece and a flat spring embracing and removably securing the keeper in place, substantially as set forth.

In testimony whereof I have signed my name to this specification in the presence of two subscribing witnesses.

DANIEL S. SEBASTIAN.

Witnesses:
CHAS. H. STROPE,
JAMES W. McGINNIS.